United States Patent
Hermann et al.

[11] 3,883,099
[45] May 13, 1975

[54] RESILIENT ENGINE MOUNT WITH SELF-LOCATING MEANS

[75] Inventors: Arthur D. Hermann, Chillicothe; Edwin L. Riedesel, East Peoria, both of Ill.

[73] Assignee: Caterpillar Tractor Company, Peoria, Ill.

[22] Filed: Feb. 14, 1974

[21] Appl. No.: 442,465

[52] U.S. Cl. .............. 248/9; 180/64 R; 248/358 R
[51] Int. Cl. ............................................ F16m 5/00
[58] Field of Search ....... 248/7, 9, 8, 10, 22, 358 R; 267/152, 153; 180/64 R

[56] References Cited
UNITED STATES PATENTS

| | | |
|---|---|---|
| 1,701,400 | 2/1929 | Whitten ................................ 248/7 |
| 1,876,812 | 9/1932 | Wiley et al. ........................... 248/9 |
| 1,943,849 | 1/1934 | Swennes ............................ 248/7 X |
| 2,034,764 | 3/1936 | Lee ........................................ 248/7 |
| 2,056,237 | 10/1936 | Trott ...................................... 248/7 |
| 2,129,829 | 9/1938 | Dunn .............................. 180/64 R |
| 2,903,208 | 9/1959 | Everitt .................................. 248/9 |
| 3,167,294 | 1/1965 | Andrews et al. ............... 267/152 X |
| 3,770,231 | 11/1973 | Kirchgessner et al. ............... 248/9 |

*Primary Examiner*—J. Franklin Foss
*Attorney, Agent, or Firm*—Phillips, Moore, Weissenberger, Lempio & Strabala

[57] ABSTRACT

A pair of resilient bushing assemblies, including a cup-shaped member, detachably mount the aft end of an engine on the frame of a vehicle. A stop means is secured to the cup-shaped member or to a structural member attached to the vehicle's frame to abut the other member to position the members axially relative to each other.

9 Claims, 7 Drawing Figures

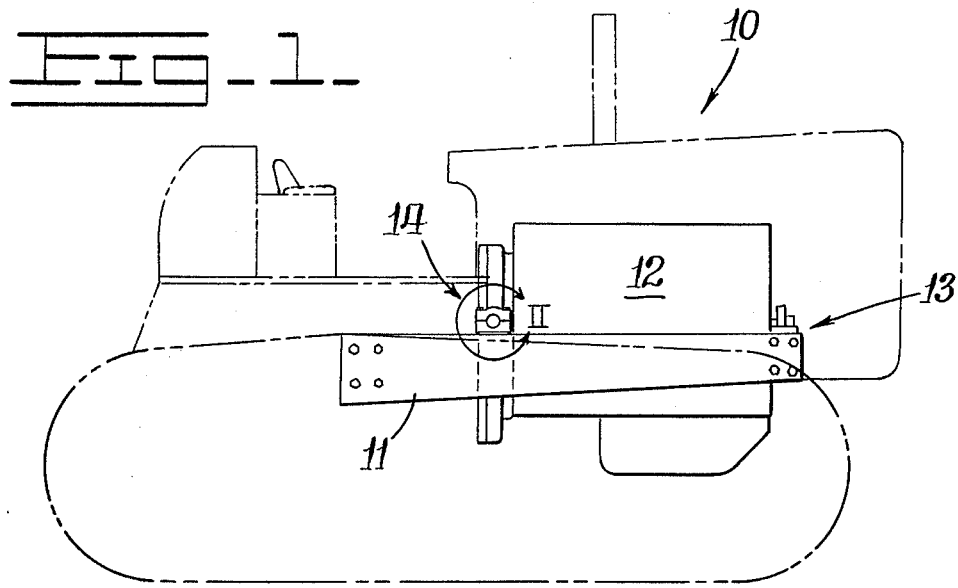
Fig. 1
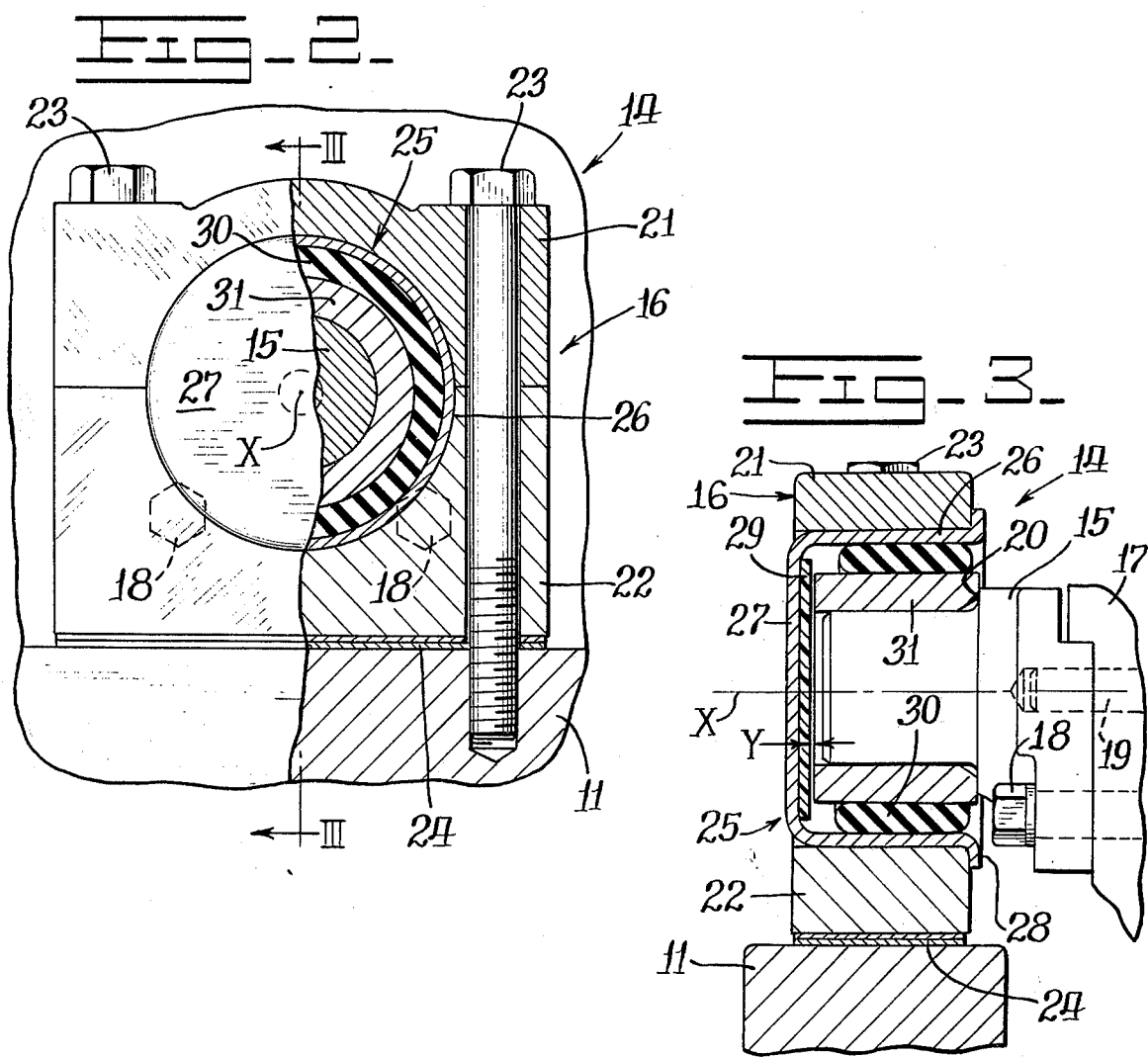
Fig. 2
Fig. 3

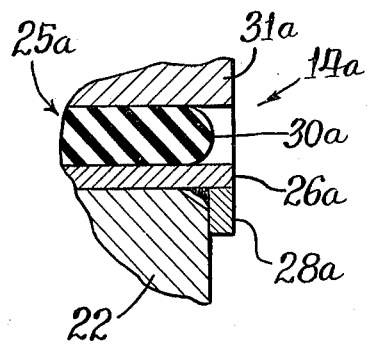
Fig_4_
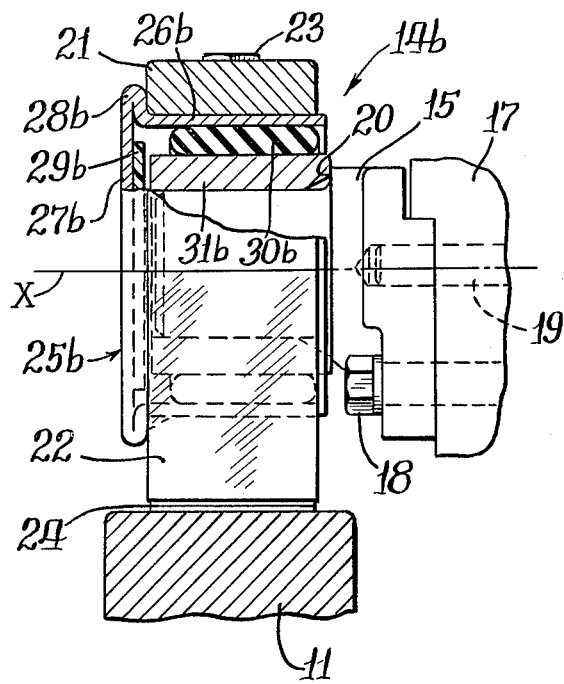
Fig_5_
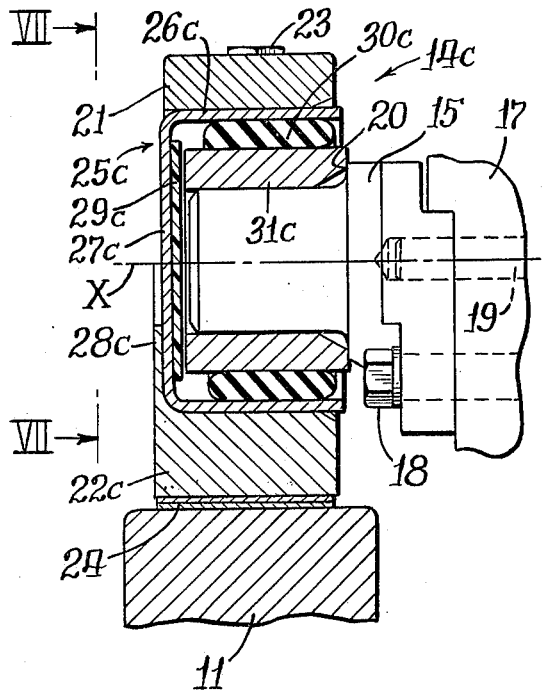
Fig_6_
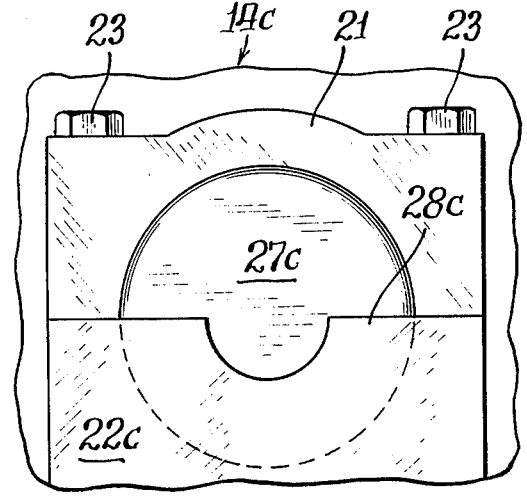
Fig_7_

RESILIENT ENGINE MOUNT WITH SELF-LOCATING MEANS

BACKGROUND OF THE INVENTION

The three-point engine support arrangement employed in a conventional track-type tractor normally comprises a trunnion secured to the front of the engine block and a pair of transversely disposed trunnions secured on either side of the engine's flywheel housing at the aft end of the engine. The engine mounts, employed to mount the trunnions on a frame of the tractor, are subjected to dynamic forces during vehicle operation, thus requiring resilient support bushings or the like to deter the transmission of such forces between the frame and the engine. Conventional mounts of this type are disclosed in U.S. Pat. Nos. 3,633,856 and 3,770,231, both assigned to the assignee of this application.

A problem arises with respect to such conventional bushing assemblies in that upon engine removal and replacement, drive train components oftentimes become misaligned. Such misalignements are normally corrected by employing complicated guaging tools and the like which further increase the "down-time" of the tractor. In the event that such misalignment is not corrected, premature failure of such drive train components, and in particular the universal joint connections, would probably ensue.

SUMMARY OF THIS INVENTION

An object of this invention is to provide an improved engine mount for precisely and expeditiously positioning an engine support trunnion relative to a frame of a vehicle. The engine mount comprises a resilient bushing assembly, including a cup member, for mounting the engine support trunnion on a structural member of the frame and stop means secured on one of the members to abut the other member for precisely positioning them axially relative to each other. The stop means may comprise an annular flange formed on either the inboard or outboard end of the cup member or a flange formed on an outboard end of the structural member of the frame.

BRIEF DESCRIPTION OF THE DRAWINGS

Other objects of this invention will become apparent from the following description and accompanying drawings wherein:

FIG. 1 is a side elevational view of a track-type tractor, shown in phantom lines, having an engine mount of this invention employed therein;

FIG. 2 is an enlarged, partially sectioned side elevational view of the engine mount, as indicated by arrow II in FIG. 1;

FIG. 3 is a sectional view of the engine mount, taken in the direction of arrows III—III in FIG. 2;

FIG. 4 is a partial section of a second engine mount embodiment;

FIG. 5 is a view similar to FIG. 3, but showing a third engine mount embodiment;

FIG. 6 is a view similar to FIGS. 3 and 5 showing a fourth engine mount embodiment; and FIG. 7 is a partial end elevational view taken in the direction of arrows VII—VII in FIG. 6.

DETAILED DESCRIPTION

Referring to FIG. 1, a track-type tractor 10 comprises a frame 11 having an engine 12 mounted thereon by three engine mounts (only two shown), disposed in triangular relationship with respect to each other, when viewed in top plan. A first engine mount 13, similar to the one disclosed in U.S. Pat. No. 3,633,856, is provided at the front, longitudinal center of the engine. Second and third identical engine mounts 14 (one shown) are provided at the aft end of the engine and on opposite, transver sides thereof.

As shown in FIGS. 2 and 3, each engine mount 14 comprises a cylindrical support member or trunnion 15 disposed on a longitudinal axis X thereof which is perpendicular to the longitudinal center line of the tractor. A first end of the trunnion is releasably attached to frame 11 by a mounting block or structural member 16 whereas a second end is attached to a flywheel housing 17 of the engine by bolts 18 and a dowel pin 19. The outboard and inboard ends of the trunnion are separated by an annular shoulder 20.

Mounting block 16 comprises a pair of upper and lower clamping members 21 and 22, suitably attached to frame 11 by bolts 23 or the like. One or more shim means 24 may be mounted between member 22 and the frame to position the engine in its correct vertical disposition relative to its attendant drive train components (not shown). The clamping members function to positively clamp a bushing assembly 25 therebetween for support of the reduced outboard end of trunnion 15.

The bushing assembly comprises a cup-shaped member or housing having a cylindrical sidewall 26, a flat end wall 27 disposed at its outboard end and a radially outwardly extending flange or stop means 28 integrally formed at its inboard end. A flat, circular elastomeric pad 29 is secured to the inner surface of end wall 27 to provide a combined thrust limiting and damping means thereat, as more fully described hereinafter. The bushing assembly further comprises an annular elastomeric bushing 30 bonded to a cylindrical sleeve 31, mounted on trunnion 15 and compressed between the sleeve and sidewall 26 of the cup member.

An outboard end of sleeve 31 is spaced at an axial distance Y from pad 29 to permit limited lateral displacement of the engine during operation thereof. The pad functions to cushion such displacement by engaging the outboard end of sleeve 31 which is moved outwardly due to the engagement of its inboard end with shoulder 20 of the trunnion. Bushing 30 dampens noise and vibrational forces acting radially relative to axis X of the trunnion to cooperate with pad 29 to provide the desired impact cushioning and dampening desiderata.

Subsequent to removal of engine 12, by disassembling front engine mount 13 and by releasing bolts 23 of the two rear engine mounts, the engine may be remounted in substantially its same position on frame 11 to assure precise alignment of the drive train components therewith. Such precise remounting is accomplished by positioning bushing assemblies 25 within their respective mounting block 16 so that flanges or stop means 28 thereof abut the inboard side of the clamping members 21 and 22. The engine will thus be located precisely at its prior position to prevent any misalignment thereof.

FIGS. 4-7 illustrate further embodiments of this invention wherein identical numerals depict corresponding constructions. Numerals depicting modified constructions in FIGS. 4-7 are accompanied by small letters "a," "b" and "c," respectively.

FIG. 4 partially illustrates an engine mount 14a including a bushing assembly 25a having its cup-shaped member mounted in a mounting block, including lower clamping member 22. An annular ring or stop means 28a is welded or otherwise suitably secured on the inboard end of a wall 26a of the cup-shaped member to extend radially outwardly therefrom to abut the inboard end of clamping member 22.

FIG. 5 illustrates an engine mount 14b including a bushing assembly 25b having an outer wall 26b of its cup-shaped member upset at its outboard end to provide a folded annular flange or stop means 28b thereat. The flange abuts outer surface portions of clamping members 21 and 22 to precisely position trunnion 15 relative to tractor frame 11.

FIGS. 6 and 7 illustrate an engine mount 14c including a bushing assembly 25c wherein a flange or stop means 28c is formed on an outboard end of a clamping member 22c of the mounting block. As shown in FIG. 7, the flange may comprise a crescent-shaped portion integrally formed with the clamping member and extending radially inwardly to abut an outboard end wall 27c of the cup member which further comprises a cylindrical outer wall 26c. Alternatively, the flange could be formed on only clamping member 21 or on both clamping members 21 and 22c.

We claim:

1. In an engine mount comprising a resilient bushing assembly, including a cup member, mounting an engine support trunnion on a structural member attached to a frame of a vehicle, the invention comprising stopmeans secured on one of said cup and structural members to abut the other member for positioning such members axially relative to each other, said stop means comprising an annular flange formed integrally on said cup member and extending radially outwardly into abutting relationship with an outboard side of said structural member.

2. The invention of claim 1 wherein said bushing assembly further comprises a cylindrical sleeve mounted on said trunnion and an annular elastomeric bushing compressed between a cylindrical sidewall of said cup member and said sleeve.

3. The invention of claim 2 wherein said bushing assembly further comprises an elastomeric pad disposed between an end wall of said cup member and an end of said sleeve.

4. The invention of claim 3 wherein an end of said trunnion is spaced axially inwardly from the end of said sleeve positioned adjacent to the end wall of said cup member.

5. The invention of claim 1 wherein said structural member comprises a mounting block releasably attached to said frame, said mounting block comprising a pair of clamping members releasably clamping said bushing assembly therebetween.

6. The invention of claim 5 wherein said clamping members are releasably attached to said frame by a pair of bolts disposed on either side of said bushing assembly.

7. The invention of claim 5 further comprising shim means disposed between one of said clamping members and said frame.

8. The invention of claim 1 wherein said cup member is upset at its outboard end to form a folded flange thereat.

9. In an engine mount comprising a resilient bushing assembly, including a cup member, mounting an engine support trunnion on a mounting block releasably attached to a frame of a vehicle, the invention comprising stop means secured on said mounting block to abut said cup for positioning said mounting block and cup axially relative to each other, said mounting block comprising a pair of clamping members releasably clamping said bushing assembly therebetween and wherein said stop means comprises a flange formed on one of said clamping members and extending radially inwardly into abutting relationship with an outboard side of said cup member.

* * * * *

UNITED STATES PATENT OFFICE
CERTIFICATE OF CORRECTION

PATENT NO. : 3,883,099
DATED : May 13, 1975
INVENTOR(S) : Arthur D. Hermann, et al It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-eight Day of October 1975

[SEAL]

Attest:

RUTH C. MASON
*Attesting Officer*

C. MARSHALL DANN
*Commissioner of Patents and Trademarks*